United States Patent
Barberis et al.

(10) Patent No.: US 9,925,830 B2
(45) Date of Patent: Mar. 27, 2018

(54) BEARING ROLLING INCLUDING A LOW FRICTION SEALING DEVICE, IN PARTICULAR FOR A HUB BEARING UNIT

(71) Applicants: Giorgio Barberis, Volpiano (IT); Fausto Morello, Sommariva del Bosco (IT)

(72) Inventors: Giorgio Barberis, Volpiano (IT); Fausto Morello, Sommariva del Bosco (IT)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/164,194

(22) Filed: May 25, 2016

(65) Prior Publication Data

US 2016/0347120 A1   Dec. 1, 2016

(30) Foreign Application Priority Data

May 29, 2015   (IT) .......................... 102015000019011

(51) Int. Cl.
*F16C 33/78*   (2006.01)
*F16C 33/80*   (2006.01)
(Continued)

(52) U.S. Cl.
CPC ............ *B60B 35/18* (2013.01); *F16C 33/586* (2013.01); *F16C 33/7826* (2013.01);
(Continued)

(58) Field of Classification Search
CPC .. F16C 19/184; F16C 33/586; F16C 33/7883; F16C 33/805; F16C 33/7826; F16C 2326/02; B60B 35/18; B60B 2380/00; B60B 2900/51; B60B 2900/1212; F16J 15/3268
USPC ....... 384/477, 478, 480, 482, 484, 486, 488, 384/544, 586, 588, 589, 569, 546–547; 277/351, 572, 303, 411
See application file for complete search history.

(56) References Cited

U.S. PATENT DOCUMENTS 3,510,138 A * 5/1970 Bowen ................. F16J 15/3264
  277/346
4,783,180 A * 11/1988 Hayashi .................. B60B 27/00
  324/173
(Continued)

FOREIGN PATENT DOCUMENTS

DE   102012002339 A1   9/2012
EP       1277978 A1 *   1/2003   .......... F16C 33/7886
(Continued)

*Primary Examiner* — Marcus Charles
(74) *Attorney, Agent, or Firm* — Bryan Peckjian; SKF USA Inc. Patent Dept.

(57) ABSTRACT

A rolling bearing providing an outer ring, an inner ring, and a plurality of rolling bodies disposed between the inner ring and the outer ring, and a sealing device held by the outer ring and consisting of a first and second annular shield and an elastomeric sealing element held by one of the shields. The second shield extends axially and radially to protrude on the outside of the outer ring and cooperates with a radially outer lateral surface of the outer ring, to delimit a radial annular gap therewith. An annular tooth is formed on the radially outer lateral surface of the outer ring in front of the radial gap to shield the radial gap in axial direction. An annular groove formed in a position immediately adjacent to the annular tooth and on the side opposite to the second shield.

10 Claims, 2 Drawing Sheets

(51) Int. Cl.
   *B60B 35/18*     (2006.01)
   *F16J 15/3268*   (2016.01)
   *F16C 33/58*     (2006.01)
   *F16C 19/18*     (2006.01)

(52) U.S. Cl.
   CPC ........ *F16C 33/7883* (2013.01); *F16C 33/805*
   (2013.01); *F16J 15/3268* (2013.01); *B60B*
   *2380/00* (2013.01); *B60B 2900/1212*
   (2013.01); *B60B 2900/511* (2013.01); *F16C*
   *19/184* (2013.01); *F16C 2326/02* (2013.01);
   *Y02T 10/865* (2013.01)

(56) References Cited

U.S. PATENT DOCUMENTS

| | | | | |
|---|---|---|---|---|
| 7,073,950 B2* | 7/2006 | Vignotto | ............... | F16C 19/184 384/482 |
| 7,793,939 B2* | 9/2010 | Ishikawa | ............... | F16C 19/386 277/353 |
| 7,960,967 B2* | 6/2011 | Kobayashi | ........... | G01D 5/2451 324/174 |
| 8,167,500 B2* | 5/2012 | Furukawa | ............. | F16C 19/386 277/345 |
| 8,303,190 B2* | 11/2012 | Shigeoka | ............. | B60B 27/0005 384/544 |
| 8,474,825 B2* | 7/2013 | Nakagawa | ............. | F16J 15/164 277/353 |
| 8,573,601 B2* | 11/2013 | Nakagawa | ........... | F16J 15/3264 277/551 |
| 2013/0127119 A1* | 5/2013 | Haepp | ................. | F16C 33/7863 277/351 |

FOREIGN PATENT DOCUMENTS

| | | | | |
|---|---|---|---|---|
| EP | 1770296 A1 * | 4/2007 | ............ | F16C 19/186 |
| KR | 101340279 B1 * | 12/2013 | ........... | G01D 5/2451 |
| WO | 2010013439 A1 | 2/2010 | | |

* cited by examiner

BEARING ROLLING INCLUDING A LOW FRICTION SEALING DEVICE, IN PARTICULAR FOR A HUB BEARING UNIT

CROSS-REFERENCE TO RELATED APPLICATIONS

This application claims priority to Italian patent application no. 102015000019011 filed on May 29, 2015, the contents of which are fully incorporated herein by reference.

TECHNICAL FIELD OF THE INVENTION

The present invention relates to a rolling bearing, in particular constituting or forming part of a hub bearing unit for vehicles, including a sealing device in low friction and high efficiency, in addition to having a low operating friction, and a simple structure an improved sealing action.

BACKGROUND OF THE INVENTION

The wheel hub unit supports on one side a wheel of a vehicle and, in the case in which the wheel is driving, are angularly connected to a respective constant-velocity joint for the transmission of drive torque from the drive shaft to the wheel itself. The wheel hub assemblies have an axis of rotation and provide, or consist of, an inner ring and an outer ring coaxial with each other and to the axis of rotation and swivel relative to one another by the interposition between them of two crowns of rolling elements.

The inner ring has a flanged inner ring to allow the attachment of a wheel to the unit and between the inner ring and the outer ring are arranged with sealing devices to prevent the entry of external contaminants into the annular space delimited between the inner and outer rings and housing the rolling bodies.

The sealing device that is interposed between the inner and outer rings on the flange side of the wheel attachment is generally formed by a pair of rigid annular screens mounted coaxial to and facing, a first integral and a second integral with the outer ring to the inner ring and in use rotating with it. Typically the first screen door an annular sealing element, provided with one or more elastically deformable annular lips which cooperate in contacting manner and/or not contacting with the second screen.

Although satisfactory, this type of rolling bearings cannot ride out the leak test currently in use, in which a pressurized liquid jet is directed obliquely against the sealing device.

SUMMARY OF THE INVENTION

The object of the present invention is to provide a rolling bearing, in particular constituent or forming part of a hub bearing unit for vehicles, including a sealing device which, while presenting a low running friction allows the overcoming of the aforementioned leak test and that ensuring a high constructive simplicity, a high compactness and a long operational life cycle.

According to the invention, there is provided a rolling bearing, in particular forming part of a hub wheel of the vehicle, as defined in the appended claims, in which the sealing device is partially integrated with the outer ring of the bearing.

BRIEF DESCRIPTION OF THE DRAWINGS

The invention will now be described with reference to the accompanying drawings, which illustrate a non-limiting example of embodiment thereof, wherein.

DETAILED DESCRIPTION OF THE INVENTION

Figure 1:
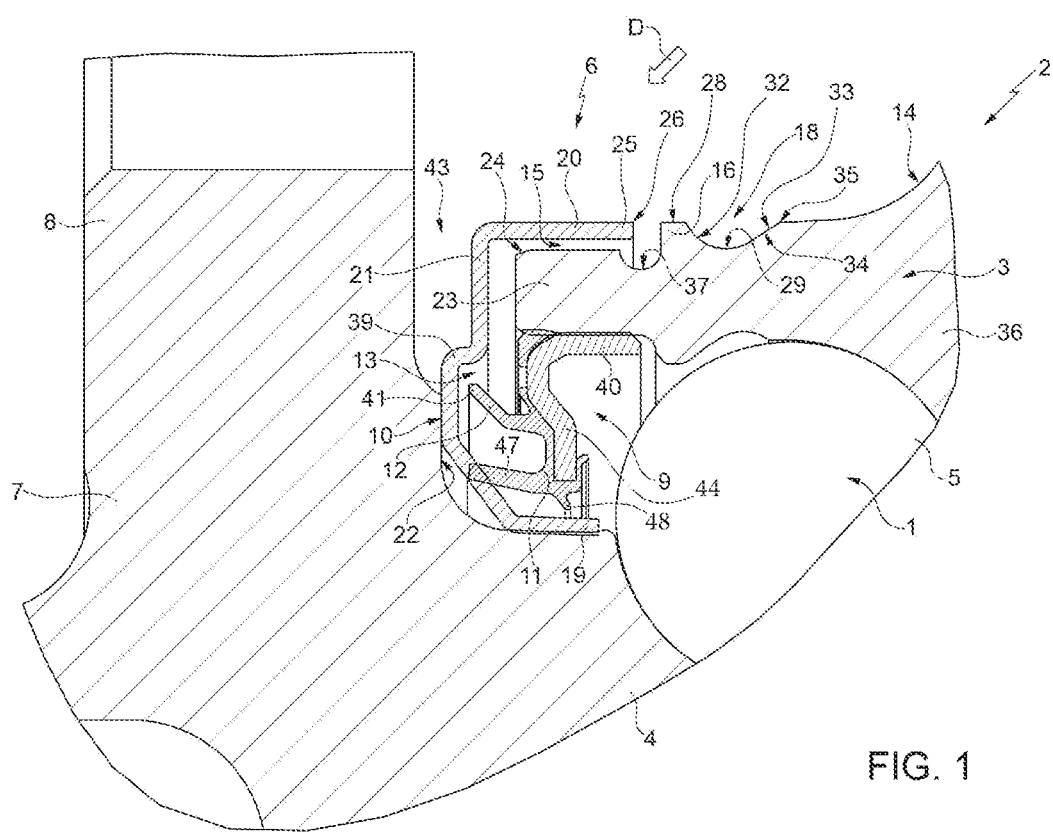
FIG. 1 illustrates schematically, in radial section a longitudinal view of a portion of a hub wheel provided with a sealing device according to the invention; is
Figure 2:
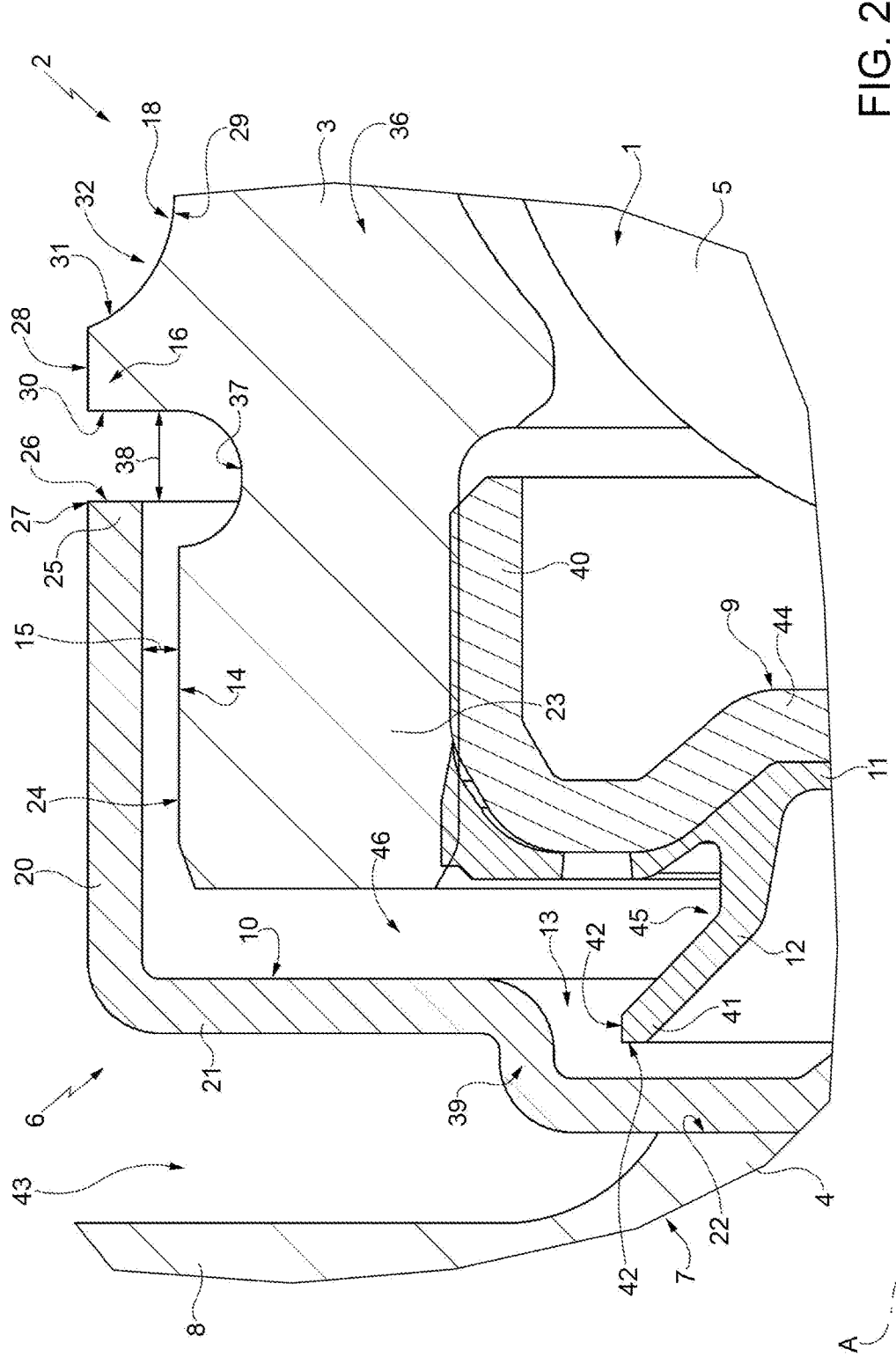
FIG. 2 illustrates in enlarged scale and always in radial section of the device of the invention as attempts detail of FIG. 1.

With reference to FIGS. 1 and 2, number 1 indicates as a whole a rolling bearing, in particular constituting, or forming part of, a hub wheel 2 of the vehicle.

The rolling bearing 1, that is, the wheel hub unit 2, are of the type known in the complex and comprise an outer ring 3, an inner ring 4, a plurality of rolling elements 5 interposed between the inner ring 4 and outer ring 3, and at least one sealing device, indicated as a whole with the reference number 6.

The outer ring 3 is in stationary use, while the inner ring 4 is rotating in use around an axis A (FIG. 2) with respect to which the rings 3 and 4 are mounted coaxial.

non-limiting example illustrated, the inner ring 4 has an end portion 7 opposite to the outer ring and which extends axially outside the outer ring 3, which end portion 7 is provided with a flange 8 of for fastening a vehicle wheel, known and not illustrated for simplicity.

According to a possible different embodiment, not illustrated for simplicity, the entire ring 4 may possibly be made in the form of two adjacent rings keyed to a single rotating spindle provided with the axially end 7 projecting out from the outer race 3 and provided with of the flange 8. in the illustrated example, however, the inner ring 4 also serves as a stub axle and in the case of double row of rolling elements 5, is provided with a ring, known and not illustrated for simplicity, for the second crown of bodies Rolling and 5, which is also not illustrated, being in part 1 of the bearing/ wheel hub 2 unit that has been removed for simplicity.

According to the invention, the sealing device 6 is, as will be seen, partially integrated with the outer ring 3, with which it creates a sealing system, and provides a first annular shield 9, substantially rigid since it proceeds in a material metal or synthetic plastic, integral with the outer ring 3 and keyed radially on the inside of the outer ring 3, a second annular screen 10, also substantially rigid since it proceeds in a metal or synthetic plastic material, integral with the inner ring 4 and keyed radially on the outside of the inner ring 4, and an elastomeric sealing element 11 carried integrally by one of 9,10 screens.

In the present case, the sealing annular element 11 is integral with the screen 9 and is provided with at least a first annular lip 12 of seal cooperating with the other screen 10 to define with it, in the example illustrated, a labyrinth seal 13.

The screen 10 is rotating in use, being keyed, in a per se known manner, angularly integral with the inner ring 4, while the screen 9 with the sealing element 11 are stationary in use, being keyed, in a per se known, angularly integral to the outer ring 3.

According to a first aspect of the invention, the screen 10 protrudes axially and radially on the outside of the outer ring 3 and cooperates with a radially outer lateral surface 14 of the outer ring 3, so as to define with it an annular radial gap 15.

The sealing device 6 further provides, in combination: an annular tooth 16 formed on the side surface 14 facing the radial gap 15, so as to shield the radial gap 15 in the axial direction; and a first annular groove 18 formed on the radially outer lateral surface 14 in a position immediately adjacent to the annular tooth 16 and on the opposite side to the screen 10.

The annular groove 18 is in particular shaped/designed to be adapted to define in use a first stationary collector for any external contaminants which are projected toward the side surface 14, in particular according to a direction of D provenance, indicated in FIG. 1 by the arrow; the annular groove 18 is then disposed immediately upstream of the tooth 16 with respect to the direction D.

The screen 9 has, in radial section an L-shape inverted, facing towards the door of the inner ring 3 and the sealing element 12 on the side facing the inner ring 4 and the flange 8.

The screen 10 is shaped in radial section substantially as a C facing towards the outer ring 3, then the opposite side to flange 8, and provides a first sleeve portion 19, a radially inner (FIG. 1), through which the screen 10 it is keyed for forcing the ring integer 3, in the vicinity of the flange 8, a second sleeve portion 20, radially outer, parallel to and facing the sleeve portion 19, and an intermediate flange portion 21 that connects the radially between them the portions to sleeve 19 and 20, which extend both axially projecting from the flange portion 21 toward the outer ring 3.

In particular, the flange portion 21 is mounted in axial abutment against a shoulder 22 of portion 7 of the internal end of the ring 4 adjacent to the flange 8, so as to remain axially deviates from, and facing, flange 8; Furthermore, the sleeve portion 20 extends radially on the outside of an end portion 23 of the outer ring 3 facing towards the screen 10 and the flange 8 and delimited by a cylindrical portion 24 of the radially outer lateral surface 14 of the outer ring 3.

Still more in particular, the screens 9 and 10 are mounted coaxial to one another and are symmetrical with respect to axis A. The sleeve portion 20 extends axially along the entire portion 24 of the side surface 14 of the outer ring 3 and defines the gap radial 15 with the end portion 23 of the outer ring 3.

The sleeve portion 20 extends axially beyond the sleeve portion 19 and ends on the opposite side to the flange portion 21 with a free end 25 that delimits a front annular edge 26 of the screen 10 facing towards the ring 3.

The annular tooth 16 extends radially with respect to the end portion 23 and has a radially outer terminal end 28 which extends radially with respect to a bottom wall 29 of the annular groove 18 and beyond the radial gap 15 until substantially flush with a radially outer edge 27 (FIG. 2) of the front annular edge 26 of the screen 10.

The annular groove 18 extends within the radial thickness of the outer ring 3 to a controlled depth and such that, in a radial direction, the bottom wall 29 is disposed substantially at the radial gap 15.

According to the preferred example of embodiment illustrated, the annular tooth 16 has, in radial section a substantially sawtooth providing (FIG. 2): a first side 30, which is facing to the screen 10 and is defined by an annular surface flat perpendicular to the lateral surface 14 radially outside of the outer ring 3; and a second side 31, which is facing the opposite side to the screen 10 and which is bordered by an annular concave curved surface which slopes down towards the bottom wall 29 of the annular groove 18, with which it is connected.

The annular groove 18 instead has, in radial section, an asymmetrical profile providing also here a first side 32 disposed toward the screen 10 and which is delimited by the same annular surface defining the curve and concave side 31 of the annular tooth 16 and by a first portion of the wall of the bottom 29, connected with the surface of the annular tooth 16; and a second side 33 on the opposite side to the screen 10 and which is delimited by a second portion of the bottom wall 29 adjacent to the first portion and by a conical surface 34, which presents taper facing towards the screen 10 and which is connected by a part with the second portion of the bottom wall 29, while the other side extends in the radial direction up to substantially in correspondence of the radially outer terminal end 28 of the annular tooth 16 to end with an annular edge 35 (FIG. 1) in correspondence of a portion 36 of outer ring 3 having a diameter or in any case greater radial thickness than those of the end portion 23.

Here and hereinafter, for the "taper" of a conical surface it means the side towards which is directed the vertex of this surface relative to its axis of symmetry, in this case coinciding with the axis A.

According to another aspect of the invention, the sealing device 6 also provides a second annular groove 37 formed on the portion 24 of the radially outer lateral surface 14 of the outer ring 3 which delimits the end portion 23; this annular groove 37 is disposed immediately adjacent to the annular tooth 16 on the side of the screen 10 and on the opposite side to the annular groove 18 and is drawn so as to be adapted to define a second manifold, stationary, for any external contaminants, immediately disposed downstream the tooth 16 to the direction D.

In particular, the annular groove 37 has, in radial section a symmetrical profile, substantially semicircular, in contrast with the asymmetric profile of the groove 18.

According to an aspect of the invention, the sleeve portion 20 extends axially and radially on the outside above the second annular groove 37, preferably up to substantially the centerline of the second annular groove 37, to define the front annular edge 26 of the screen 10, which is then facing towards the annular tooth 16 and arranged facing to, and axially distant from the tooth 16, so as to define with the annular tooth 16, an axial gap 38 (FIG. 2).

The radially outer edge 27 of the front annular edge 26 is disposed substantially flush with the radially outer terminal end 28 of the annular tooth 16 at an axial distance from the same defined by the gap 38.

In the illustrated example, the flange portion 21 of the screen 10 is axially external to the outer ring 3 and is provided with a double bend 39 L disposed in a radial position substantially corresponding to that of a portion 40 press fit into the outer ring 3, shaped in the sleeve, screen 9; the annular lip 12 has a free end 41 (FIG. 2) defined between a pair of flat surfaces 42 perpendicular to each other and cooperates by means of the free end 41 with the double bend 39 L to define with the flange portion 21 in the labyrinth seal 13.

According to a last aspect of the invention, the flange 8 of the inner ring 4 and the flange portion 21 of the screen 10 are shaped so as to delimit between them an annular channel 43, in a rotary use, adapted to serve as a rotary manifold for any external contaminants coming from the direction D (or, for another, also from any other direction).

The lip 12 is also shaped in radial section so as to delimit together with a flange portion 44 of the screen 9 that extends cantilevered radially on the inside of the press fitted portion 40, an annular channel or gutter 45, arranged in correspondence with a annular chamber 46 (FIG. 2) defined between the terminal portion 23 of the ring 3 and the flange portion 21.

The sealing element 11 also provides, preferably, the other two annular sealing lips, indicated respectively by the references 47 and 48 (FIG. 1). The lip 47 extends in the radial direction that is radially on the inside of the axial lip 11, radially "under" the same and cooperates in contacting manner (in the illustrated example) or not contacting with the flange portion 21, while the lip 48 It extends in the opposite direction to the lip 47 and forming an obtuse angle with the lip 47 and cooperates in a non-contacting with a portion of the first sleeve portion 19 of the screen 10 so that the lips 47 and 48 define together with the screen 10 two further seals (sliding or labyrinth, arranged radially on the inside of the labyrinth seal 13.

The external contaminants and, in the test phase, the jet of liquid that comes from the direction D, are intercepted by a side from the tooth 16 and, on the opposite side, from the screen 10 and the channel 43. Before reaching the tooth 16, the contaminants/test jet coming from the D direction are also first of all intercepted by the groove 18 which, thanks to its shape and to that of the side 31 of the tooth 16, deflects the same over the end 28 and the axial gap 38; contaminants/liquid that may fall in the gap 38 are also collected from the groove 37; in any case the radial gap 15 is shielded from the tooth 16 and the grooves 18 and 37 which contaminants/test liquid cannot reach the chamber 46; if something arrived in that room is still collected by the annular channel or gutter 45 without reaching the labyrinth seal 13 and is then evacuated by gravity through the gap 15 and the groove 37.

Contaminants that come from the opposite direction to D are intercepted by the channel 43 which is rotating and that therefore also evacuates them by centrifugal effect, supported from the screen 10, also rotating it and which acts as a slinger.

All the objects of the invention are thus achieved.

The invention claimed is:

1. A rolling bearing for a vehicle wheel bearing unit, comprising:
   an outer bearing ring,
   an inner bearing ring,
   a plurality of rolling bodies interposed between the inner ring and the outer ring, and a sealing device; the sealing device having a first annular shield, the first annular shield being a single component and constructed from a rigid material, and held by the outer ring radially on the inside, a second annular shield, held by the inner ring radially on the outside, the second shield extending axially and radially to protrude on the outside of the outer ring and cooperating with a radially outer lateral surface of the outer ring, to delimit a radial annular gap therewith; and an elastomeric sealing element held by one of the shields and provided with at least one first annular lip cooperating with the other shield to define a labyrinth seal therewith; wherein the sealing device further provides, in combination:
   an annular tooth formed from the radially outer radially outer surface of the outer bearing in front of and extend beyond the radial gap to shield the radial gap in an axial direction; and
   a first annular groove formed from the radially outer lateral surface of the outer bearing ring, in position immediately adjacent to the annular tooth and on the side opposite to the second shield; the first annular groove being adapted to define a first collector for possible external contaminants.

2. The rolling bearing according to claim 1, wherein the annular tooth radially extends to protrude with respect to an end portion of the outer ring facing towards the second shield, the annular tooth having a radially outer terminal end, which radially extends to protrude with respect to a bottom wall of the first annular groove and beyond the radial gap substantially until it is flush with a radially outer edge of an annular frontal rim of the second shield; and the first annular groove extends in depth within the outer ring, according to a radial direction, up to the radial gap.

3. The rolling bearing according to claim 2, wherein the annular tooth has in radial section a substantially saw-tooth shaped profile, having a first side that faces towards the second shield and defined by a flat annular surface perpendicular to the radially outer lateral surface of the outer ring; and a second side that faces the second shield on the opposite side that is delimited by a concave curved annular surface which slopes towards the bottom wall of the first annular groove, to which it joins.

4. The rolling bearing according to claim 2, wherein the first annular groove has an asymmetric profile in radial section having a first side arranged towards the second shield that is delimited by an annular, curved and concave surface and by a first portion of the bottom wall, joined to the surface of the annular tooth; and a second side arranged on the side opposite to the second shield that is delimited by a second portion of the bottom wall and by a conical surface facing towards the second shield and that joins on one side to the second portion of the bottom wall, while on the other side it extends in radial direction substantially to the radially outer terminal end of the annular tooth to end with an annular edge at a portion of the outer ring having diameter greater than that of the end portion.

5. The rolling bearing according to claim 1, wherein the sealing device further provides a second annular groove formed on a portion of a radially outer lateral surface of the outer ring delimiting an end portion of the outer ring facing towards the second shield; the second annular groove being arranged immediately adjacent to the annular tooth on the side of the second shield and on the opposite side to the first annular groove and being adapted to define a second collector for external contaminants.

6. The rolling bearing according to claim 5, wherein the second annular groove has a substantially semicircular symmetric profile in radial section.

7. The rolling bearing according to claim 5, wherein the second shield is shaped in radial section as a C facing towards the outer ring and provides a first radially inner sleeve portion, the second shield is keyed on the inner ring, a second radially outer sleeve portion, parallel to and facing the first sleeve portion, and a flange portion that radially connects the first and second sleeve portions, which both axially extend to protrude from the flange portion towards the outer ring; the second sleeve portion extends radially on the outside of the end portion of the outer ring and axially along the stretch of the radially outer lateral surface of the outer ring delimiting the end portion, with which it defines the radial gap; the second sleeve portion ending on the side opposite to the flange portion with a free end, which axially and radially extends to protrude on the outside over the second annular groove, preferably substantially to the middle line of the second annular groove, to define a frontal annular rim of the second shield facing towards the annular tooth and arranged facing it and axially distanced from it to define an axial gap with the annular tooth; a radially outer edge of the front annular rim being arranged substantially flush with a radially outer terminal end of the annular tooth.

8. The rolling bearing according to claim 7, wherein the flange portion of the second shield is axially external to the outer ring and is provided with a double L fold substantially at a sleeve-shaped journaling portion of the first shield; the first annular lip cooperating with the double L fold with a free end thereof to define the labyrinth seal with the flange portion.

9. The rolling bearing according to claim 1, wherein the second shield is shaped in radial section substantially as a C facing towards the outer ring, which is stationary; and the inner ring has an end portion opposite to the outer ring that axially extends to protrude from the outer ring, the end portion of the inner ring being provided with a flange and the inner ring rotating; the second shield having an intermediate flange portion that radially connects a first and a second sleeve portion, which extend to protrude axially from the flange portion; the flange of the inner ring and the flange portion of the second shield being shaped to delimit there between an annular channel that rotates, adapted to work as rotating collector for external contaminants.

10. A wheel hub unit comprising:
a rolling bearing having an outer ring,
an inner ring,
a plurality of rolling bodies interposed between the inner ring and the outer ring, and a sealing device; the sealing device having a first annular shield, the first annular shield being a single component and constructed from a rigid material, and held by the outer ring radially on the inside, a second annular shield, held by the inner ring radially on the outside, the second shield extending axially and radially to protrude on the outside of the outer ring and cooperating with a radially outer lateral surface of the outer ring, to delimit a radial annular gap therewith; and an elastomeric sealing element held by one of the shields and provided with at least one first annular lip cooperating with the other shield to define a labyrinth seal therewith; wherein the sealing device further provides, in combination:
an annular tooth formed from the radially outer radially outer surface of the outer bearing in front of and extend beyond the radial gap to shield the radial gap in an axial direction; and
a first annular groove formed from the radially outer lateral surface of the outer ring, in position immediately adjacent to the annular tooth and on the side opposite to the second shield; the first annular groove being adapted to define a first collector for possible external contaminants.

* * * * *